Sept. 29, 1953 G. W. HOPKINS 2,653,764

DIVISION ALIGNER

Filed Jan. 30, 1950 7 Sheets-Sheet 1

*INVENTOR.*

George W. Hopkins

Sept. 29, 1953 G. W. HOPKINS 2,653,764

DIVISION ALIGNER

Filed Jan. 30, 1950 7 Sheets-Sheet 2

*INVENTOR.*

[signature]

Sept. 29, 1953 G. W. HOPKINS 2,653,764

DIVISION ALIGNER

Filed Jan. 30, 1950 7 Sheets-Sheet 3

INVENTOR.

Sept. 29, 1953 G. W. HOPKINS 2,653,764

DIVISION ALIGNER

Filed Jan. 30, 1950 7 Sheets-Sheet 4

INVENTOR.

Sept. 29, 1953 | G. W. HOPKINS | 2,653,764

DIVISION ALIGNER

Filed Jan. 30, 1950 | 7 Sheets-Sheet 5

INVENTOR.

Sept. 29, 1953 G. W. HOPKINS 2,653,764

DIVISION ALIGNER

Filed Jan. 30, 1950 7 Sheets-Sheet 6

INVENTOR.

Sept. 29, 1953 G. W. HOPKINS 2,653,764

DIVISION ALIGNER

Filed Jan. 30, 1950 7 Sheets-Sheet 7

INVENTOR.

[signature]

Patented Sept. 29, 1953 2,653,764

UNITED STATES PATENT OFFICE 2,653,764

DIVISION ALIGNER

George W. Hopkins, San Leandro, Calif., assignor to Friden Calculating Machine Co., Inc., a corporation of California Application January 30, 1950, Serial No. 141,275

8 Claims. (Cl. 235—63)

This invention relates to a division mechanism for calculating machines and more particularly to means for automatically aligning the dividend and divisor prior to the outset of a division operation.

In performing division operations on calculating machines of the type having relatively shiftable dividend and divisor receiving devices, it has been necessary in the past for the operator of the machine to enter each of the factors into the machine and then to manually control the shift of the factor receiving devices relative to one another until the highest significant digits of the factors have been brought into alignment. The division mechanism is then set into operation by manipulation of a suitable control key or lever and the machine proceeds to divide the dividend by the divisor in a fully automatic manner without requiring any further attention on the part of the operator.

The present invention deals with an improved mechanism for rendering the automatic division mechanism of a calculating machine more completely automatic by causing the dividend and divisor to be properly aligned prior to the outset of the division phase of the operating sequence. The mechanism of the present invention is also operable to decrease the length of time required to complete such a division operation by automatically entering a substantial portion of the quotient into the revolutions counter during the alignment phase of the operating cycle. After the operator has set the dividend and divisor into a machine constructed and operated in accordance with the present invention, the division key is depressed and the novel mechanism to be hereinafter disclosed causes a substantial portion of the quotient to be entered into the revolutions counter while the two factor receiving devices are shifted relative to each other until the highest order digits are brought into proper alignment for division, whereupon the machine proceeds to rapidly complete final determination of the quotient during automatic division.

It is an important object of the present invention, therefore, to provide a mechanism for automatically aligning the dividend and the divisor prior to the outset of an automatic division operation.

It is another object of the instant invention to provide an automatic division aligning mechanism for a calculating machine which is operable to substantially speed up the operation of the automatic division mechanism by entering a substantial portion of the quotient into the revolutions counter during the automatic self-aligning phase of the division operation.

It is also an object of the present invention to provide a dividend and divisor aligning mechanism which utilizes the existing automatic division mechanism for effecting alignment of the division factors in a calculating machine, which mechanism is operable to speed up determination of the quotient by automatically entering a substantial portion thereof into the revolutions counter during the aligning operation.

It is still another object of the present invention to provide a mechanism for automatically aligning the dividend and divisor in a calculating machine in such a manner as to cause a portion of the quotient to be entered into the revolutions counter while the two factor receiving devices are shifted relative to each other until the highest order digits are brought into proper alignment for division, thereby enabling the machine to automatically complete the determination of the quotient in less time than would otherwise be required.

Further objects are to provide a construction of maximum simplicity, economy, and ease of assembly and disassembly, also such further objects, advantages, and capabilities as will fully appear and as are inherently possessed by the device and the invention described herein.

The invention further resides in the combination, construction, and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof, or the scope of the appended claims.

Referring to the drawings.

The machine to be hereinafter shown and described is basically the same as the calculating machine shown in U. S. Patent No. 2,229,889 issued to Carl M. F. Friden on January 28, 1941, and hence, only so much of the mechanism shown and described in the aforesaid patent will be set forth herein as is necessary in order to provide a complete understanding of the manner in which the present mechanism is related to that shown in the patent. Similarly, the automatic division mechanism herein employed is essentially like that illustrated in Frieden Patents No. 2,327,981 and No. 2,403,273; therefore, only those parts of the automatic division mechanism which are directly concerned with the present invention will be disclosed in this application.

*Selecting and actuating mechanisms*

Figure 1:
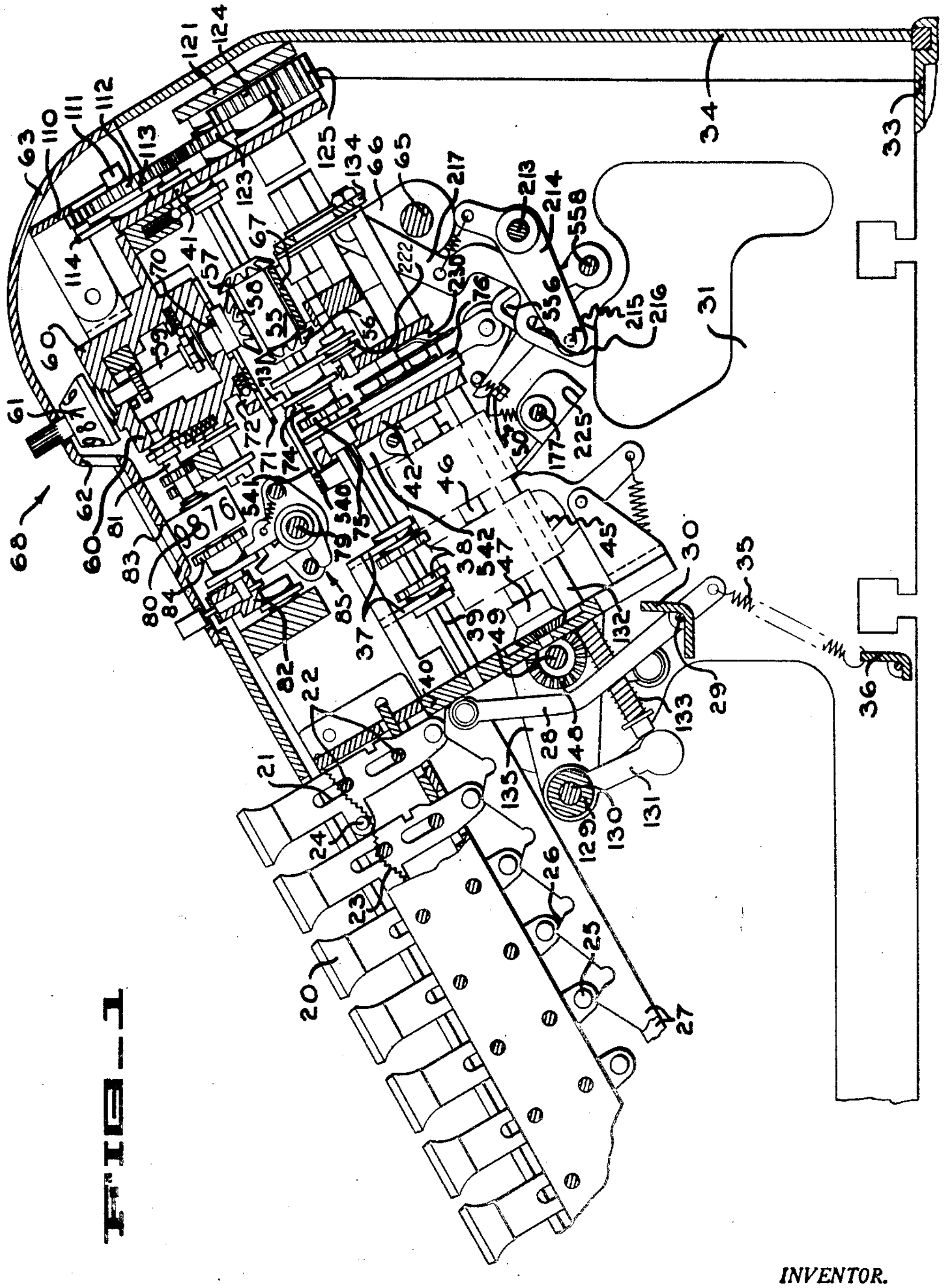
Fig. 1 is a longitudinal sectional elevation showing the basic mechanism of the machine.

Referring now to Fig. 1 of the drawings, there is shown a calculating machine provided with a plurality of rows or banks of amount keys 20, each of which is mounted for vertical sliding movement by a pair of oblong slots 21 adapted to cooperate with through-rods 22 which are transversely supported horizontally across the keyboard frame. The keys 20 in each bank are resiliently urged to their raised positions by means of a longitudinally extending coil spring 23 supported by the keyboard frame in such a manner that the spring is threaded over the upper through-rods 22 and under the pins 24 provided on the stems of the keys 20. The lower ends of the key stems carry studs 25 which are adapted to cooperate with inclined cam faces 26 provided on the longitudinally disposed selection slides 27. There are two such slides associated with each bank of keys in the keyboard, each slide 27 being supported for endwise reciprocating movement below the keyboard by means of a pair of parallel links 28. The rearward supporting links only are shown in Fig. 1, being pivotally connected at their upper ends to the selection slides 27 and pivotally supported at their lower ends on a transverse rod 29 supported by an angle bar 30 which extends between a left side frame 31 and a right side frame 32 (Fig. 6) and is supported thereby across the bed of the machine. Side frames 31 and 32 are suitably secured to a base 33 which also serves as a support for the removable covers or housing 34 of the machine.

Each of the selection slides 27 is resiliently urged toward the rear of the machine by a spring 35 tensioned between the lower end of each of the rear supporting links 28 and an angle bar 36 extending between the side frames of the machine. At their rearward ends, the selection slides 27 are provided with bent-over and downwardly depending forked extensions 37 which engage with coacting grooves provided in the hubs of a pair of selector gears 38. The selection gears 38 are slidably and nonrotatably mounted on a square shaft 39 which is suitably journalled at its ends in the crossframe members 40 and 41 and is also rotatably supported intermediate its ends by a suitable bearing provided in an intermediate crossframe 42 extending transversely between the side frames 31 and 32 of the machine.

The selector gears 38 are arranged to cooperate with a drum-type actuator 45 secured to an actuator shaft 46 which is journalled between the crossframe members 40 and 42, which shaft has secured to its forward end a bevel gear 47 which meshes with a bevel gear 48 secured to a transverse inidirectional drive shaft 49. Also secured to the same actuator shaft 46 in a position immediately behind the drum 45 is a second actuator drum 50 which is adapted to similarly cooperate with a pair of selector gears controlled by an adjacent bank of amount keys 20.

As is more fully shown and described in the aforementioned patents, the actuator drums 45 and 50 for adjacent orders of the machine are provided with a series of stepped actuator teeth which serve to rotate the selector gears by differential amounts whenever the latter are slid forwardly on the square shaft 39 and into cooperative driving relationship with the drum teeth. As is fully described in the above-mentioned patents, the "1" to "5" keys 20 control the selector gears associated with the forward end of the actuator drums 45 and 50, while the "6" to "9" keys control the selector gears associated with the rear end of the actuator drums. When one of the "1" to "5" keys or one of the "6" to "9" keys is depressed, its associated selector bar or slide 27 is moved forwardly by a differential amount through the cooperation of the key stem stud 25 with its coacting inclined camming surface 26, so as to cause the corresponding selector gear 38 to be differentially positioned with respect to its associated actuator drum. The actuator teeth on the drums 45 and 50 will therefore rotate the selector gears 38 and the associated square shafts 39 to an extent depending upon the value of the particular keyboard key 20 which has been depressed.

Slidably and nonrotatably mounted on the rear end of each square shaft 39 is a sleeve 55 to which is secured an add gear 56 and an oppositely disposed subtract gear 57, which gears are arranged to cooperate selectively with a bevel gear 58 secured to the lower end of a coacting dial shaft 59, the latter being suitably journalled in carriage frame 60 which extends longitudinally across a shiftable numeral wheel carriage 63. Secured to the upper end of each dial shaft 59 is a numeral wheel 61 bearing the numerals from "0" to "9" which may be viewed through a suitable aperture or window 62 provided in the shiftable carriage housing 63.

Figure 3:
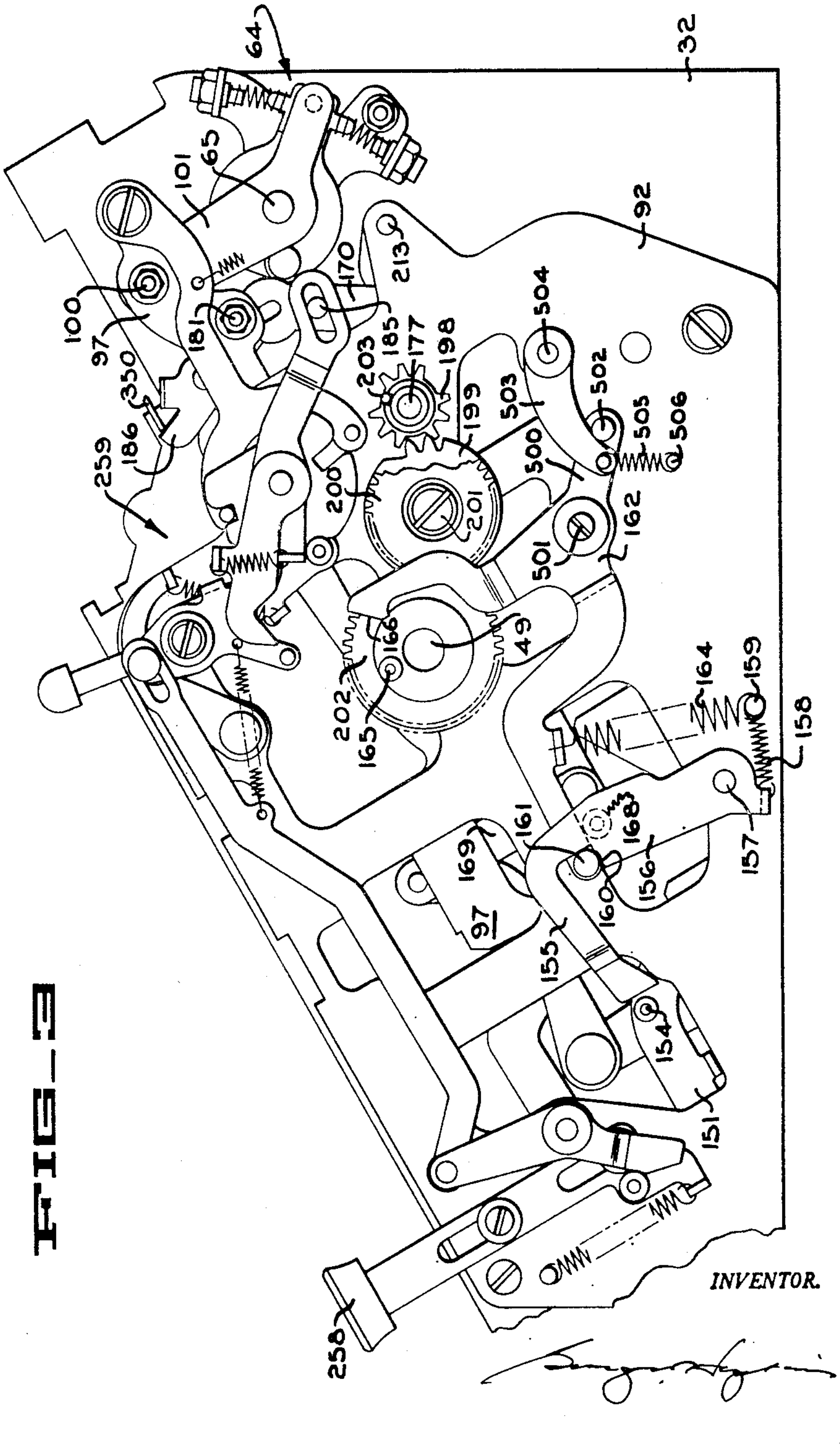
Fig. 3 is a view showing those parts of the division control mechanism which are mounted on the right-hand side of the control plate.

The add and subtract gears 56 and 57 are normally maintained in a neutral position and out of engagement with the bevel gears 58 by the action of a conventional spring actuated centralizer mechanism 64 (Fig. 3) which yieldingly tends to maintain a transverse gate control shaft 65 in the neutral position illustrated in Fig. 1. Shaft 65 is journalled in the side frame members 31 and 32 and has secured thereto a pair of upwardly extending spaced arms 66 which support, parallel with the axis of shaft 65, a strap or gate 67 lying within the space existing between the add and subtract gears 56 and 57. Whenever bevel gears 56 and 57 are maintained in their neutral position by the action of centralizer 64, as shown in Figs. 1 and 3, the numeral wheel carriage 68 may be shifted laterally across the machine without interference from add gear 56 or subtract gear 57. However, by means of mechanism hereinafter to be described, the gate 67 may be moved rearwardly so as to engage add gear 56, with bevel gear 58 so that upon rotation of the actuator shafts 46 the accumulator wheels 61 will be rotated in a forward or positive direction. Similarly, in subtract operations, the gate 67 is moved forwardly so as to cause the subtract gear 57 to mesh with dial shaft gear 58 and thereby cause the associated numeral wheel 61 to be rotated in a reverse or negative direction upon unidirectional rotation of the actuator shafts 46.

*Tens transfer mechanism*

Secured to the lower end of each of the dial shafts 59 just above the gear 58 is a transfer cam 70 which is adapted to cooperate with a transfer lever 71, bearing a stud 72, which is journalled in the carriage frame bar 60. Mounted on the outer end of the transfer lever 71 is a downwardly depending pin 73 which lies between a pair of flanges provided on the hub 74 of a tens-transfer gear 75 located in the next higher order of the machine. The hub 74 and the gear 75 are slidably and nonrotatably mounted on the square shaft 39 in such a manner that rotation of the gear 75 will be transmitted through the add-subtract gears 56, 57 to the coacting dial shaft 59. When the accumulator numeral wheel 61 passes from "0" to "9" or from "9" to "0," a single tooth or nose on the transfer cam 70 is operative to rock the transfer lever 71 and move the pin 73 forwardly so as to move the transfer gear 75 forwardly into the path of a single transfer tooth provided on a tens-transfer actuator 76 secured to the shaft 46. Since pin 73 is operative to control the transfer gear 75 in the next higher order of the machine, the accumulator dial 61 in the next highest order will be advanced one step by the tens-transfer actuator 76 in such a manner as to effect the tens-carry from one order to the next higher order as required.

*Revolutions counter*

Also provided in the numeral wheel carriage 68 is a series of revolutions counter wheels 80, each of which is secured to a longitudinally extending shaft 81 having its opposing ends journalled in the carriage frame bar 82 and in the hollow crossbar 60. Each of the wheels 80 is provided with a series of numerals from "0" to "9" which may be viewed through a window 83 provided in the carriage casing 63. Secured to each of the shafts 81 in a position adjacent to the wheels 80 is a ten-tooth actuator gear 84 which is arranged to cooperate with a revolutions-counter actuator mechanism 85 mounted on a shaft 79. The shaft 79 is rocked (clockwise in Fig. 1) to permit the nose of the actuator to rock into mesh with the gear 84, and then the shaft is shifted longitudinally to rock the gear 84 for a count of 1. Whenever the numeral wheel carriage 68 is in its extreme left-hand position, the rightmost revolutions counter wheel 80 will be thus advanced one step for each rotation of the actuator shafts 46. This mechanism is fully shown and described in the above-mentioned Patent No. 2,229,889 to which reference may be had for a full and complete disclosure of the revolutions-counter mechanism.

*Plus and minus keys*

A plus key 90 and a minus key 91, slidably mounted on control plate 92, selectively determine positive or negative registration on the carriage numeral wheels 61, and a depression of either of the keys 90, 91 serves to engage the clutch and close the motor circuit, as well as select the sign character of the registration. The plus and minus keys 90, 91 are provided with the respective roller studs 93 and 94 (Fig. 2) which cooperate with inclined cam faces 95 and 96, respectively, formed on a gate setting slide 97. Slide 97 is pivotally connected to the upper ends of arms 98 and 101 (Figs. 2 and 3), the arm 98 being pivoted at 99 to the control plate 92, while the arm 101 is secured to the gate shaft 65. Thus, depression of plus key 90 moves the gate setting slide 97 rearwardly in such a manner as to rotate shaft 65 clockwise, thereby moving gate 67 (Fig. 1) toward the rear of the machine so as to cause the add gears 56 to engage with the dial shaft gears 58. Similarly, depression of the minus key 91 brings stud 94 into engagement with the inclined surface 96, thereby causing slide 97 to move forwardly and rotate gate shaft 6 counterclockwise so as to bring the subtract gears 57 into engagement with the dial shaft gears 58.

For the purpose of initiating the cycling mechanism of the machine when either of the control keys 90 or 91 is depressed, each of these keys is provided with a half-round stud 102 which is adapted to cooperate with an inclined camming surface 103 provided on a cycle initiating slide 104. The rear end of this slide bears against a control pin 105 which is adapted to be moved rearwardly thereby so as to impart a corresponding movement to an associated linkage mechanism which is operable to energize the driving motor of the machine and to cause the main clutch thereof to be engaged. This mechanism is shown and described in the afore-mentioned Patent No. 2,327,981 to which reference may be had for a more complete disclosure thereof.

*Carriage shift mechanism*

Mechanism is provided for shifting the carriage in either direction from one ordinal position to another by power driven means which is controlled by manually operable shift keys and is actuated by the two right-hand actuator shafts 46 in a manner to be hereinafter more fully described.

Figure 6:
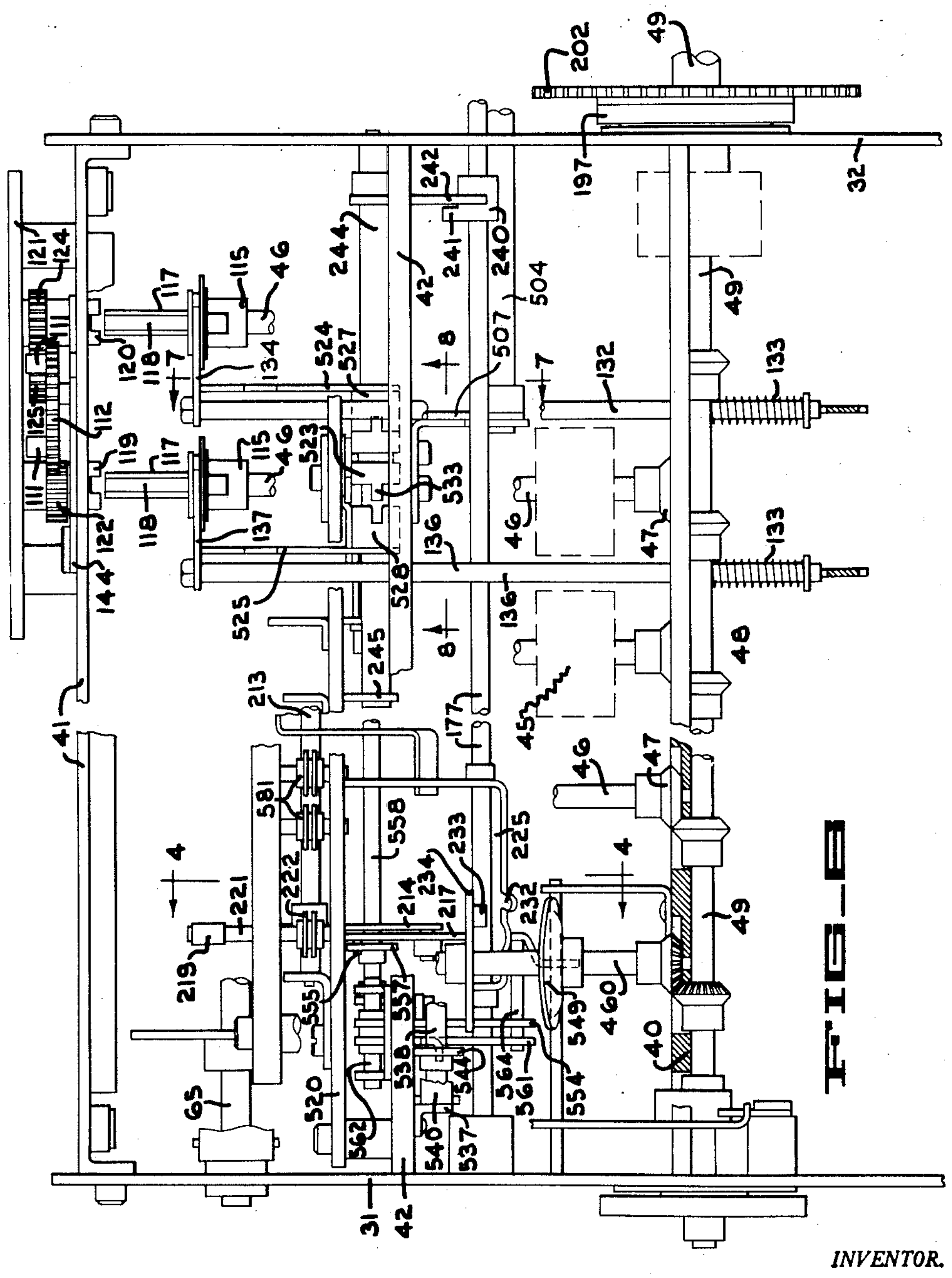
Fig. 6 is a plan view showing the lateral arrangement of certain of the parts involved in the novel division aligner mechanism.

As shown in Figs. 1 and 6, numeral wheel carriage 68 has supported thereon a notched plate 110, the notches of which are arranged to be engaged by a pair of shift pins 111 secured to the rear face of a carriage shift gear 112 journalled in the crossframe 41. For each one-half revolution of shift gear 112, carriage 68 will be shifted one ordinal position in such a manner as to cause the dial shaft gears 58 to lie in cooperative relationship with the next adjacent set of add-subtract gears 56, 57. Shift gear 112 is centralized by means of a cam 113 which coacts with a pair of suitable centralizing arms 114 having a coiled tension spring suitably connected therebetween. Thus, when the pins 111 are in horizontal alignment as shown in Figs. 1 and 6, carriage 68 is properly located in one of its predetermined ordinal positions by the action of the centralizing mechanism.

Referring now to Fig. 6, the two right most actuating shafts 46 are extended rearwardly and are operable selectively to drive shift gear 112 in either direction. For this purpose each of the jaw collars 115 carried by the rear end of these two actuating shafts is provided with a diametric slot which engages a toothed collar 117, longitudinally shiftable with respect to the associated shaft 46 and collar 115 but rotatable therewith. Each shiftable coupling 117 is provided with a pair of diametrically opposed clutch teeth 118 which are designed to engage with corresponding slots provided in gear sleeves 119 and 120, the latter being rotatably journalled between the crossbar 41 and a frame plate 121. Gear sleeve 119 has mounted thereon a gear 122 adapted to mesh with an idler gear 123 (Fig. 1) journalled between the crossframe 41 and the plate 121, which gear 123 also meshes with the shift gear 112. Gear sleeve 120 has mounted thereon a gear 124 which lies out of the plane of the idler gear 123 and meshes with a wide reverse idler gear 125 which is suitably journalled between the frame 41 and plate 121. Idler gear 125 meshes with gear 123 in such a manner that counter-clockwise rotation of gear sleeve 120, as viewed from the front of the machine, causes a clockwise rotation of shift gear 112 and a shifting of the numeral wheel carriage to the right. In like manner, rotation of gear sleeve 119 in a counter-clockwise direction, as viewed from the front of the machine, effects a corresponding counter-clockwise rotation in shift gear 112 and causes the carriage 68 to be shifted to the left. Thus, by selectively establishing one or the other of the drive connections between the gear sleeves 119 and 120 and their associated collars 115, carriage 68 may be shifted laterally in either direction. The connection between the collars and their associated gear sleeves may be selectively effected by shifting the members 117 rearwardly so as to establish a drive from the actuator shafts 46 to the carriage shift gear 112. The gear ratios are selected in such a manner that one rotation of the actuating shaft 46 effects a 180 degree rotation of shift gear 112, and with the result that carriage 68 is shifted one ordinal space to the right or to the left.

A pair of manually operable shift keys, preferably of the type disclosed in U. S. Patent No. 2,327,635 issued to Carl M. Friden on August 24, 1943, are provided for controlling the operation of the coupling members 117. Whenever the right shift key is depressed for shifting carriage 68 toward the right, sleeve 129 (Fig. 1) is rocked counter-clockwise about its supporting shaft 130, which sleeve is journalled between the right side frame 32 and bracket 135. In this manner an arm 131 secured to the left end of sleeve 129 is caused to engage with the forward end of rod 132 which is mounted for endwise sliding movement in crossbars 40 and 42. As shown in Fig. 1, rod 132 is resiliently urged towards the front of the machine by a spring 133 compressed between cross bar 40 and a suitable washer mounted on the forward end of rod 132. At the rear end of rod 132 there is provided a shift fork 134, the end of which is adapted to engage with an angular groove provided in the associated coupling member 117 (see also Fig. 6). Thus, when sleeve 129 is rocked counter-clockwise, arm 131 will move rod 132 rearwardly in opposition to the action of spring 133 so as to move the teeth 118 on coupling member 117 into engagement with corresponding notches provided in the gear sleeve 120. This rearward movement of member 117 is insufficient to cause the teeth on the end of the associated actuator shaft 46 to become disengaged from the slots provided in collar 115, with the result that a positive driving connection is established between the actuator shaft 46 and gear sleeve 120. As is more fully disclosed in the afore-mentioned Patent No. 2,327,635, depression of either of the shift keys causes the electric driving motor to be energized and the clutch to be engaged so that actuator shafts 46 are rotated in such a manner as to cause shifting movement of the carriage.

In a smilar manner, depression of the left shift key will cause the shaft 130 to be rocked counter-clockwise, as viewed in Fig. 11, thereby causing an arm secured to the shaft, similar to arm 131, to move a rod 136 (Fig. 6), similar to the rod 132, rearwardly in the machine in such a manner as to cause its associated shift fork 137 to move the left-hand coupling member 117 rearwardly for operatively engaging the teeth 118 thereof with the coacting slots provided in gear sleeve 119.

*Automatic division mechanism*

The machine shown in the accompanying drawings is provided with a mechanism for enabling a dividend set up on the accumulator wheels 61 to be automatically divided by the method of successive subtraction by a divisor set up on the amount keys 20. As was mentioned earlier herein, the mechanism provided in the present machine for accomplishing this purpose is similar to that shown in U. S. Patent No. 2,327,981, and, therefore, only those parts of the automatic division mechanism which are directly concerned with the present invention will now be described.

The automatic division mechanism operates to control the functioning of the machine so as to cause the divisor to be repeatedly subtracted from the dividend until an overdraft occurs in the accumulator, whereupon the overdraft is corrected and the carriage is then automatically shifted one ordinal space to the left. This sequence is continually repeated during the division operation and the number of subtraction cycles effected in each order is registered in the revolutions counter as the quotient. This division operation is controlled by the program control mechanism, which becomes effective each time an overdraft occurs in the accumulator to program the operation of the add-subtract mechanism and the carriage shift mechanism in such a manner as to cause a predetermined sequence of operations during uninterrupted cyclic operation of the division mechanism. The division operation is initiated by the depression of a division key, which causes the program control mechanism to be operatively connected with the add-subtract gate and the carriage shift mechanism, and also renders the overdraft control mechanism effective to control the operation of the program control mechanism.

Figure 2:
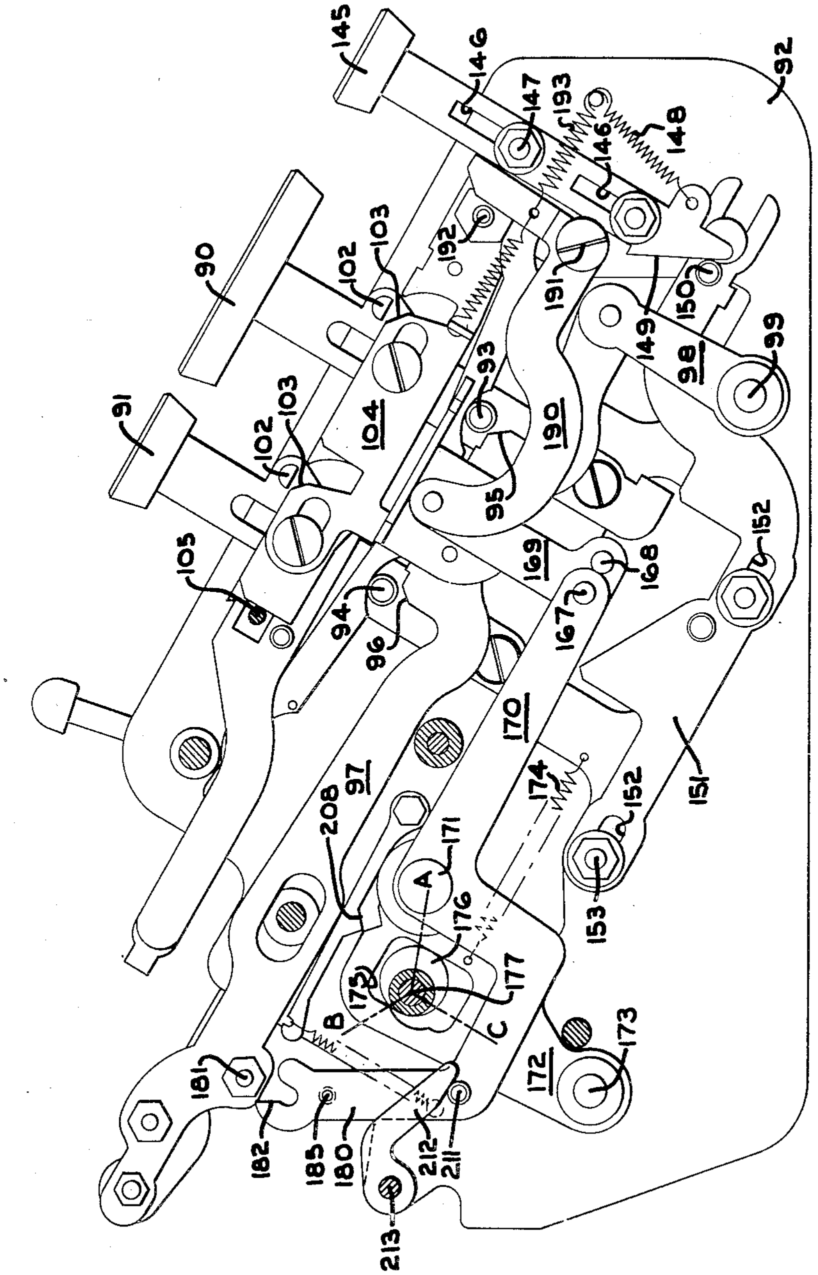
Fig. 2 is a view showing those parts of the division control mechanism which are mounted on the left-hand side of the control plate.

As shown in Fig. 2, a division key 145 is supported by a longitudinally disposed pair of elongated slots 146 for endwise sliding movement on the coacting guide studs 147 carried by control plate 92. Key 145 is normally urged to its raised position by means of a suitable spring 148 and the key is also provided with an inclined cam face 149 which bears against a roller stud 150 mounted on a division control slide 151, which slide is supported for endwise sliding movement on control plate 92 by a plurality of elongated slots 152 and cooperating studs 153 secured to the control plate. As shown in Fig. 3, slide 151 carries a roller stud 154 lying in front of a finger 155 formed on the upper end of a latch 156 pivotally mounted as at 157 on the control plate 92. Finger 155 is urged forwardly by the resilient action of a spring 158 secured at one end to the lower extremity of latch 156 and at its other end to a stud 159 mounted on control plate 92. The resilient action of spring 158 normally maintains a shoulder 160 on latch 156 beneath a stud 161 mounted on the forward end of a division setting actuator 162 which is pivotally supported on screw 501 affixed to the control plate 92. This actuator 162 is urged to rotate in a counter-clockwise direction by the resilient action of a relatively strong spring 164 tensioned between the actuator and the stud 159 in such a manner as to urge stud 161 into engagement with shoulder 160. Whenever the division key 145 is depressed, however, cam face 149 (Fig. 2) engages roller stud 150 in such a manner as to move slide 151 rearwardly, with the result that the roller stud 154 thereon rocks latch 156 (clockwise in Fig. 3) so as to remove shoulder 160 from beneath stud 161 and allow the actuator 162 to be rocked counter-clockwise by the resilient action of the relatively strong spring 164. Actuator 162 will be restored to its initial position during recycling of the machine by the cam action of a roller 165 (Fig. 3) secured to the face of a gear 202 which rotates with the shaft 49, which roller is operable to engage an inclined cam face 166 formed on an upwardly extending arm of the actuator in such a manner as to rock actuator 162 (clockwise in Fig. 3) against the urgency of spring 164 and thereby permit latch 156 to re-engage with the stud 161.

Lying beneath the forward end of actuator 162 is a roller 168 (see also Fig. 2) carried by the lower end of a link 169 which is pivotally connected as at 167 to the forward end of a connecting lever 170, which lever is pivoted as at 171 to a follower arm 172 pivoted as at 173 to control plate 92. This arm 172 is urged in a clockwise direction, as viewed in Fig. 2, by means of spring 174, and is provided with a cam follower aperture 175 within which is located an eccentric cam 176 secured to a program controlling shaft 177. As is more fully described in the afore-mentioned Patent No. 2,327,981, shaft 177 forms a part of the program control mechanism and is rotated intermittently during division operations in such a manner as to control the setting of the add-subtract gate and the intermittent operation of the left shift clutch, which operations are performed in a predetermined sequence so as to cause the machine to carry out a division operation in a fully automatic manner.

Lever 170 is provided at its rearward end with an upwardly directed arm 180 (Fig. 2) which is bifurcated at its upper extremity for the purpose of engaging with a stud 181 carried by the gate setting slide 97. Thus, a depression of division key 145 releases actuator 162 (Fig. 3) for operation under the influence of spring 164 in such a manner as to impart a downward movement to roller 168 and cause lever 170 (Fig. 2) to be rocked clockwise. When the control shaft 177 is in the normal or home position illustrated in Fig. 2, cam 176 thereon causes arm 172 to be maintained in its most forward position so that when lever 170 is rocked clockwise, by depressing division key 145, an inclined cam face 182 provided on the rear lip of the bifurcation engages with stud 181 and forces gate setting slide 97 into its forward position so as to engage the subtract gears 57 with the dial shaft gears 58. Mounted on the arm 180 is a stud 185 which is adapted to be engaged by a spring-pressed latch so as to retain lever 170 in its operative position throughout the division operation.

Pivotally connected to the upper end of link 169 is the rearwardly extending arm of a bell-crank lever 190 (Fig. 2) which is pivotally supported at its forward end by a screw 191 secured to control plate 92. This lever 190 has an upwardly extending right angle extension which lies immediately in front of a pin 192 carried by the cycle initiating slide 104. The lever 190 is urged in a clockwise direction (Fig. 2) by a spring 193 in such a manner as to normally maintain link 169 in its raised position wherein roller 168 engages with the underside of actuator 162 (Fig. 3) and maintains lever 170 in the position shown in Fig. 2. Whenever division key 145 is depressed, however, link 169 is forced downwardly by the action of the relatively strong spring 164, thereby rocking lever 190 (counter-clockwise in Fig. 2) and forcing slide 104 rearwardly so as to actuate the stud 105 in such a manner as to energize the electric driving motor and simultaneously move the main clutch of the machine to its fully engaged or torque transmitting position.

Referring now to Fig. 3, it will be noted that program control shaft 177 extends through plate 92 and has secured to its right-hand end a small mutilated gear 198 which is positionable in driving relationship with a larger mutilated gear 199 secured to a conventional gear 200, the latter being rotatably journalled on a screw 201 mounted in control plate 92. Gear 200 meshes with gear 202 carried by transverse drive shaft 49, which shaft is driven by a motor and gear train (not shown herein but fully described in Patent No. 2,229,889 above mentioned) whenever the main clutch 197 (Fig. 6) is engaged. The small mutilated gear 198 is normally located in an inoperative position wherein it lies out of the plane of the larger mutilated gear 199, which inactive position is determined by a notch provided in gear 198 engaging over a pin 203 projecting outwardly from the control plate 92. As viewed from the front of the machine, shaft 177 and the small mutilated gear 198 carried thereby are normally urged to the left by a suitable compression spring, not shown, mounted on the left-hand end of the shaft 177, which spring is adapted to urge the notch in gear 198 to engage over pin 203 in order to normally maintain the small mutilated gear 198 out of the plane of the large mutilated gear 199. As shown in Fig. 3, gear 198 has three peripherally equidistantly spaced-apart sets of three teeth, each such set being adapted for cooperation with a single set of two teeth provided on the large mutilated gear 199. As gear 199 rotates counter-clockwise during cycling of the machine the two teeth thereon are positioned to successively engage each of the sets of three teeth on gear 198 before the add-shift-subtract cycle is completed. Thus, when gear 198 is projected into the path of gear 199 during a division operation, gear 198 will be rotated clockwise through one-third of a revolution at the end of the first complete revolution of gear 200 and also through one-third of a revolution at the end of each of the two next succeeding complete revolutions of gear 200, during which time gear 198 is maintained in its projected position into the plane of gear 199 by engagement of the outermost end of pin 203 with the inner face of the small mutilated programming gear 198.

Figure 4:
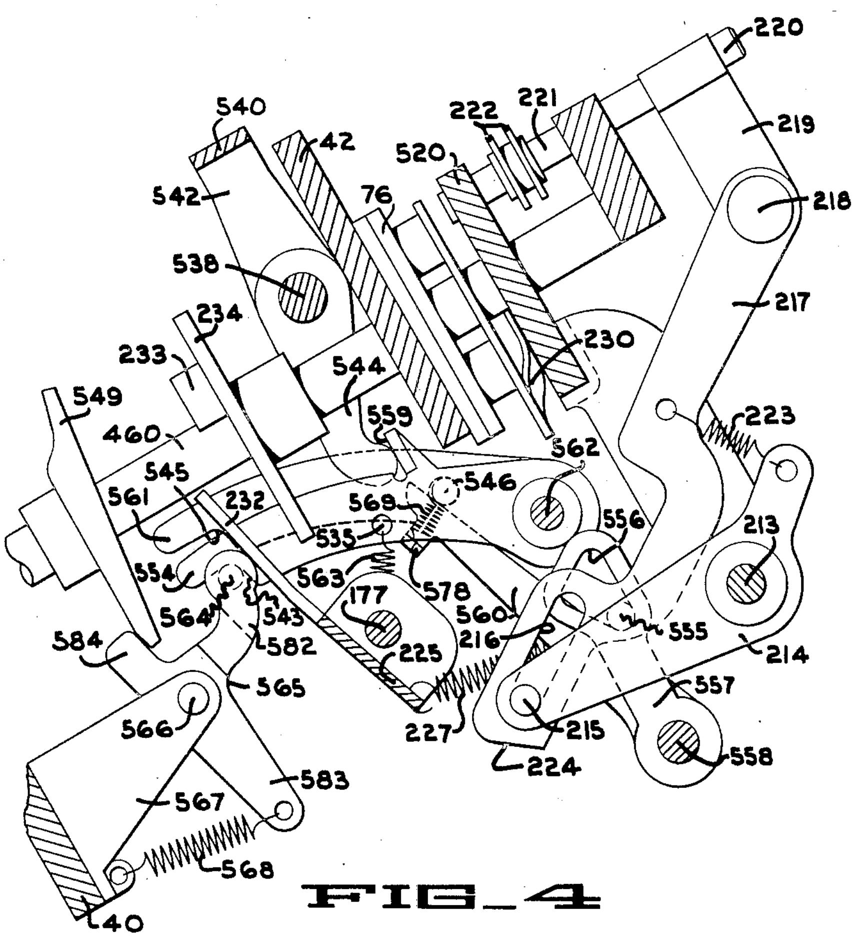
Fig. 4 is a longitudinal sectional elevation of the overdraft control mechanism taken along the line 4—4 in Fig. 6 and looking in the direction of the arrows.

A stud 211 mounted below stud 185 on lever 170 (Fig. 2) lies beneath the forward end of an arm 212 secured to a laterally extending shaft 213 journalled in control plate 92 and in the left side frame 31 of the machine. Near the left-hand side of the machine, shaft 213 carries an arm 214 (Figs. 1 and 4) which carries a stud 215 adapted to engage with an elongated slot 216 provided in the lower end of an overdraft control link 217. Link 217 is pivoted at its upper end on a pin 218 carried by a yoke 219, the latter being secured to an extension 220 provided on the highest order tens-transfer detent pin 221. As shown in Fig. 4, pin 221 has a pair of flanges 222 adapted to engage with either side of one of the coacting flanges provided on the hub 74 for the associated highest order tens-transfer gear 75, which hub is located on the leftmost square shaft 39 of the machine. Whenever a transfer is to be effected from a lower to a higher order, transfer gear 75 is moved forwardly and into the path of a single tooth provided on the tens-transfer actuator disk 76, as was mentioned earlier herein. Thus, whenever a transfer is effected which involves the shifting of the highest order transfer gear, the resulting overdraft moves pin 221 forwardly so as to cause a corresponding movement of the yoke 219 and the overdraft control link 217 pivotally attached thereto. In the normal position illustrated in Fig. 4, the forward end of link 217 is urged to its lower or inactive position by a spring 223. Upon depression of the division key 145 and rocking of the lever 170, however, shaft 213 will be rocked by stud 211 and arm 212 (clockwise as viewed in Fig. 4), thereby lifting the forward end of link 217 in such a manner as to place an abutment face 224 thereon immediately behind a bail 225 which is pivotally, but nonslidably mounted on the program control shaft 177, which bail is normally held in the counter-clockwise position shown in Fig. 4 by the resilient action of spring 227. Whenever the abutment face 224 of link 217 has been moved up behind bail 225, and an overdraft takes place which causes the highest order transfer gear to be moved forward, bail 225 will be rocked clockwise about shaft 177, in opposition to the action of spring 227, and in such a manner as to move a flag 232 formed on bail 225 into the path of travel of a pin 233 secured to an actuating disk 234 carried by a shaft 460, which shaft corresponds to the actuator shafts 46 with the exception that the actuators 45 and 50 are omitted. Thereafter, as this shaft 460 rotates counter-clockwise, as viewed from the front of the machine, pin 233 contacts flag 232 near the end of that machine cycle and forces shaft 177 to the right so as to move the small mutilated gear 198 into the path of its associated driving gear 199. In this manner shaft 177 and eccentric cam 176 (Fig. 2) will be given three steps of intermittent movement during the next three machine cycles, after which gear 198 will drop back over the pin 203 and be returned to its inactive position. Meanwhile, overdraft control link 217 is moved toward the rear of the machine so as to release the flag 226 as a result of the restoration of the detent pin 221 by the restoring cam 230 carried by the rear end of the leftmost actuator shaft 46.

Whenever eccentric cam 176 occupies the position marked A in Fig. 2, which is the position of the cam when the notch in the small mutilated gear 198 engages with pin 203, clockwise movement of lever 170 (Fig. 2) causes gate setting slide 97 to be moved forwardly in such a manner as to engage the subtract gears 57 with the dial shaft gears 58. At the end of the subtract cycle in which an overdraft occurs, however, shaft 177 will be rotated counter-clockwise (Fig. 2) through 120 degrees to the position marked B, with the result that arm 172 will also be rocked counter-clockwise and move lever 170 toward the rear of the machine, thereby causing the add-subtract gate 67 to be moved to its add position. During the next machine cycle, the divisor set up on the amount keys 20 will be added back into the accumulator dials; thus correcting the overdraft. At the end of this correction cycle shaft 177 will be rotated through another 120 degrees to the position marked C (Fig. 2), in which latter position eccentric cam 176 moves arm 172 to an intermediate position wherein the add-subtract gears 56 and 57 are held out of engagement with the dial shafts 58 immediately prior to a carriage shifting operation. Arm 172 is yieldably urged to and maintained in this intermediate position by the action of a spring-urged centralizer arm 209 having a V-shaped nose adapted to engage with a corresponding notch provided in the upper edge of arm 172.

In order to cause the carriage to be shifted one ordinal position to the left, that is, in the direction of increasing orders, during the machine cycle following the angular movement of shaft 177 to position C, shaft 177 has secured thereto a cam 240 (Fig. 6) provided with an actuating nose 241. When shaft 177 is moved toward the right by the action of pin 233 on flag 232, cam 240 is conditioned for operation by being moved into the plane of a follower arm 242 secured to a transverse shaft 244 journalled at its right-hand end in the side frame 32 and at its left-hand end in a bracket 245 secured to the crossframe 42. Referring to Fig. 6, it will be observed that the axial movement which is imparted to shaft 177 and cam 240 by stud 233 is such as to bring the nose 241 of cam 240 into the plane of follower arm 242. The angular positioning of nose 241 on cam 240 is such that whenever eccentric cam 176 on shaft 177 is turned from position B to position C, cam 240 rocks follower arm 242 upwardly so as to impart a rocking movement to shaft 244 (clockwise when viewed from the right). Shaft 244 has a clutch member 523 (Fig. 6) non-rotatably and slidably mounted thereon. Normally this member engages a collar 527 rotatably mounted on the shaft 244 having fast therewith an arm 524 cooperable with a yoke 134 for causing a right shift when the shaft is rocked. However, during division operations, the jaw clutch member 523 is moved to the left to engage left shift clutch collar 528. Collar 528 has an integral arm 525 which, when rocked (clockwise when viewed from the right), moves yoke 137 rearwardly, thus enabling left shift clutch 118, 119 and causing the carriage to shift one order to the left.

The calculating machine is provided with a counter reversing key 258 (Fig. 3) which lies beside division key 145 and both keys 145 and 258 are normally depressed together whenever a division operation is initiated. A depression of key 258 actuates a conventional linkage mechanism so as to cause the revolutions counter 80 to be operated in a reverse or negative direction, thereby enabling the subtraction cycles occurring during a division operation to be counted in a positive sense. The mechanism for accomplishing this result is indicated generally at 259 in Fig. 3, and is completely disclosed in U. S. Patent No. 2,294,111 granted to Carl M. F. Friden on August 25, 1942.

*Automatic division aligner*

Figure 7:
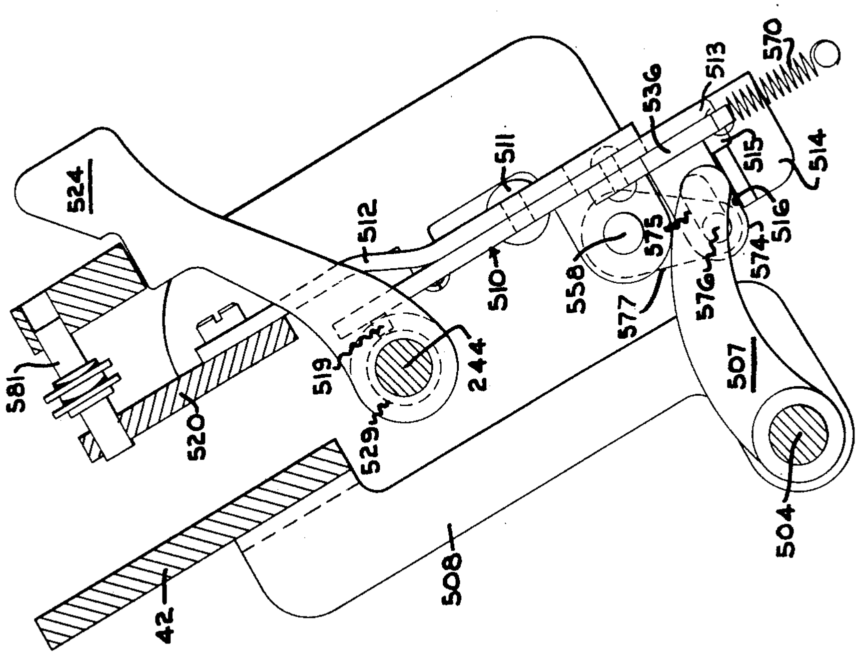
Fig. 7 is a sectional elevation of the carriage shift reversing mechanism taken along the line 7—7 in Fig. 6 and looking in the direction of the arrows.
Figure 8:
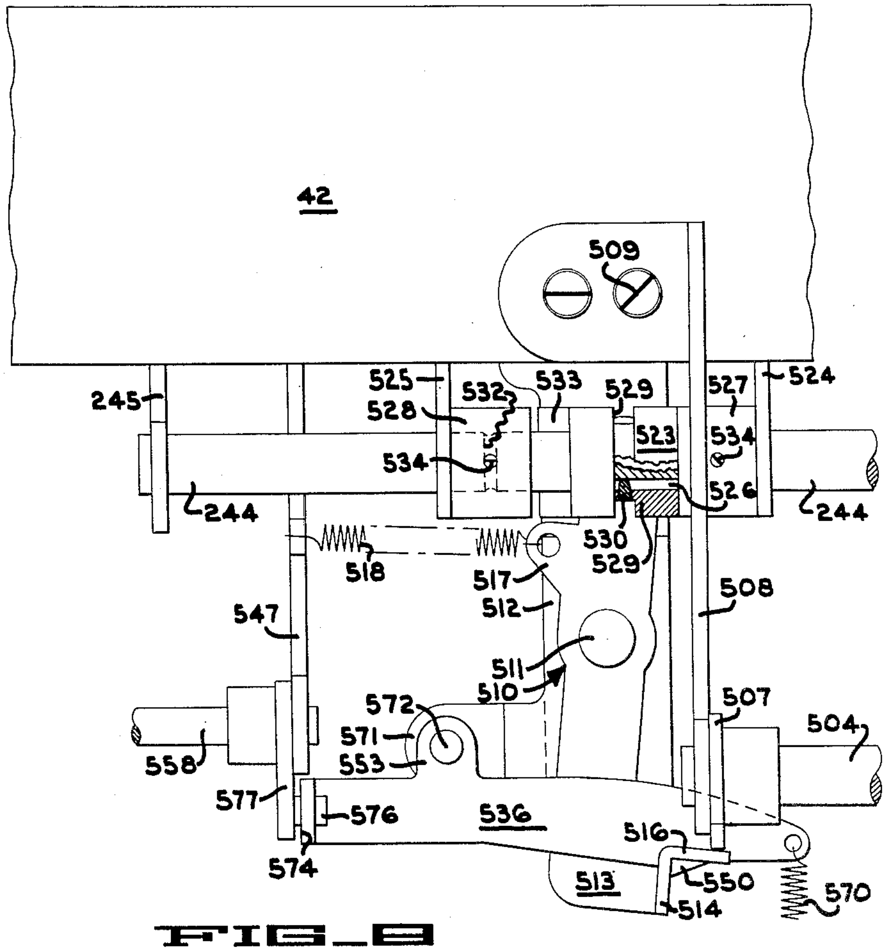
Fig. 8 is a front view of the carriage shift reversing mechanism taken along the line 8—8 in Fig. 6.

Since the numeral wheel carriage normally comes to rest in its extreme left-hand position at the conclusion of a division operation, it has been necessary for the machine operator to shift the carriage to the right in performing a subsequent division operation until the highest order digits of the dividend and the divisor are brought into proper alignment. In order to render this alignment operation automatic, and to relieve the operator of the necessity of controlling the shift of the carriage until the dividend and divisior are properly aligned for the performance of a division operation, the mechanism hereinafter to be described has been provided. In the use of the machine embodying the invention, the dividend is entered inboard with respect to the transfer detecting member 219. This mechanism makes use of the previously described program control device to accomplish the alignment operation, which programming mechanism has been suitably modified so as to cause the carriage to be automatically tabulated to the right until the division factors are properly aligned, after which the division phase of the operation will automatically take place in the manner previously described. For this purpose, division actuator bellcrank 162 (Fig. 3), which is pivotally mounted on pin 501, is provided with a rearwardly extending arm 500. The free end of arm 500 bears a stud 502 adapted to engage with the lower surface of an arcuate arm 503 which is keyed to a transverse shaft 504 and is continuously urged against the stud 502 by the resilient action of a coil spring 505 anchored at its lower end on a pin 506 carried by the control plate. As is best shown in Figs. 7 and 8, shaft 504 is journalled at its inner end in a downwardly depending bracket extension 508 supported on frame 42 and secured thereto by the screws 509. Shaft 504 is provided with a lever 507 adapted to engage with the horizontal contact surface 516 of a bent-over ear or right-angle extension 514 provided on the lower arm 513 of a shift clutch actuating lever 510 pivotally supported as at 511 on a downwardly extending bracket 512 suitably secured to frame 520. The upper end of lever 510 is provided with an ear 517 having a hole therein which engages with one end of a coil spring 518 having its other end anchored on a bearing support bracket 547, which spring tends to continually urge lever 510 in a counter-clockwise direction, as viewed in Fig. 8.

Shaft 244 extends transversely across the carriage shift control mechanism shown in Figs. 7 and 8, has its inner end journalled in a bracket 245 supported on an auxiliary frame member 520 carried by the frame 42 (see also Fig. 6). On opposite sides of the lever 510 shaft 244 has rotatably mounted thereon the oppositely disposed and spaced-apart shift clutch collars 527 and 528, each of which is rotatably held thereon by a set screw 534 (Fig. 8) cooperating with an annuar groove 532 formed in shaft 244 so as to allow free rotational movement while restraining axial or longitudinal movement of the clutch collars 527 and 528 along the shaft. The right shift control collar 527 has an actuator 524 affixed thereto which is operable to engage shift fork 134 and move the right shift rod 132 rearwardly so as to engage clutch teeth 118 with the associated gear sleeve 120 (Fig. 6). In a similar manner, the left shift control collar 528 carries an actuator 525, which upon engagement of a jaw clutch 523 with the collar 528, rotates with shaft 244 for engagement with its associated shift fork 137 in such a manner as to move the left shift control rod 136 rearwardly as shown in Fig. 6, with the result that the clutch teeth 118 are moved into operative engagement with gear sleeve 119. Supported on shaft 244 in a position between the clutch collars 527 and 528, and keyed to shaft 244 for rotation therewith while also being longitudinally or axially slidable therealong, is a shiftable jaw clutch 523 having an annular groove 529 thereon adapted to receive and retain in engagement therewith a shift pin 519 (Fig. 7) affixed to and carried by the upper arm of lever 510. As shown in Fig. 8, shaft 244 has formed thereon a key way 526 extending longitudinally between the rotatably supported clutch collars 527 and 528, and a key 530 inserted through a suitable hole formed in the bottom of annular groove 529 in collar 523 engages with key way 526 in such a manner that the shiftable jaw clutch 523 rotates with shaft 244, but can be longitudinally moved by lever 510 into engagement with either of the rotatably supported clutch collars 527 and 528. Thus, whenever jaw clutch 523 and lever 510 are latched by a bar latch 536 in the right shift position shown in Fig. 8, jaw clutch 523 transmits torque from shaft 244 to clutch collar 527 so as to move the right shift arm 524 into engagement with its associated shift fork 134. The shifting mechanism is then conditioned for shifting the register carriage to the right, that is, in the direction of decreasing orders. Whenever the lower end 513 of lever 510 is released from engagement with bar latch 536, however, lever 510 is moved counter-clockwise by spring 518 (Fig. 8) so as to release jaw clutch 523 from engagement with clutch collar 527 and to move the shiftable clutch into engagement with the oppositely disposed clutch collar 528, in which left shift enabling position jaw face 533 on the laterally shiftable clutch 523 is moved into operative engagement with a coacting jaw face on the left shift clutch control collar 528.

Bar latch 536 has an upwardly extending lug 553 (Fig. 8) thereon which is pivotally supported on a pin 572 carried by a bracket extension 571 which extends laterally outwardly from the lever supporting bracket 512. Latch 536 is vertically movable within groove or slot 515 (Fig. 7) provided at the lower end of lever 510, and has a downwardly depending tooth 550 on the lower edge thereof which is operable to engage with the coacting edges of slot 515. The bar latch 536 is urged clockwise by spring 570 to the position shown in Fig. 8, and is rocked to a disengaged position, against the urgency of the spring, by lever 577. As is best shown in Fig. 7, latch 536 is provided at its other end with a right angle extension 574 having an oblong slot 575 (Fig. 7) therein. This slot is adapted to receive and retain for free sliding engagement therewith a pin 576 carried by an arm 577 secured to a shaft 558 extending transversely across the left side of the machine and journalled at its right end in bearing bracket 547. Thus, whenever a counter-clockwise rotation is imparted to the shaft 558, as viewed in Fig. 7, pin 576 coacts with oblong slot 575 in such a manner as to impart a counter-clockwise movement to bar latch 536 (Fig. 8), thereby moving tooth 550 out of latching engagement with vertical slot 515. Thereupon spring 518 is operable to disengage jaw clutch 523 from the right shift clutch collar 527 on shaft 244, and moves it into operative engagement with the left shift clutch collar 528. It will be recalled that during operation of an automatic division mechanism of the type disclosed in Friden Patent No. 2,327,981 a predetermined rocking movement is intermittently imparted to shaft 244, and to the shiftable jaw clutch 523 carried thereby, by cam 240 on the programming control shaft 177, which rocking movement occurs whenever the nose 241 (Fig. 6) on cam 240 is positioned for operative engagement with the associated follower arm 242 carried by shaft 244.

Figure 5:
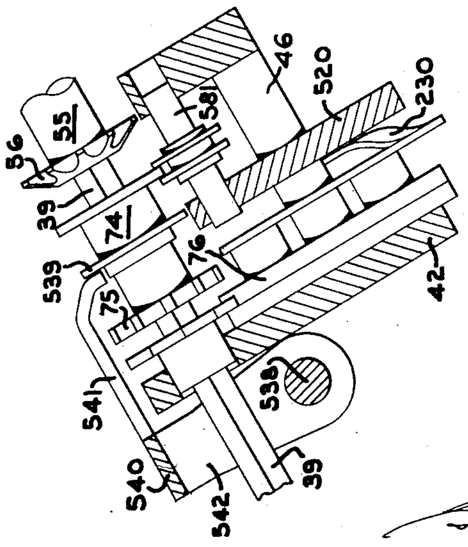
Fig. 5 is a longitudinal sectional elevation of the inboard order sensing means for rendering the division programming mechanism operative to effect alignment of the dividend in the accumulator with the divisor on the keyboard.

As is shown in Figs. 5 and 6, a shaft 538 extends transversely across the machine and is journalled in suitable bearing brackets carried by the crossframe 42. Shaft 538 has extending upwardly from the ends thereof a pair of spaced arms 542 which support for rotation about the axis of shaft 538 a transversely disposed bail or gate 540 which is provided with a rearwardly extending finger 541 for each order of the machine. Each such finger is bent downwardly at its free end so as to coact with a transfer disk, or flange, 539 (Fig. 5) carried by the associated transfer hub 74. Thus, whenever a tens-transfer occurs in any intermediate order of the machine, the associated hub 74 and gear 75 are moved forwardly by the associated transfer lever 71 in such a manner as to impart through finger 541 a counter-clockwise movement (as viewed in Fig. 5) to bail 540. Bail 540 is urged rearwardly (clockwise in Figs. 4 and 5) by means of a spring 563 which urges latch 554 downwardly, a face 559 on the latch bearing against the lower end of arm 544 rigidly secured to shaft 538. Since the free end of each such finger is continuously urged against its coacting transfer disk 539 by the coil spring 563, finger 541 follows disk 539 and moves clockwise about shaft 538 as an axis when, during the same cycle, cam 230 secured to the end of the associated actuator shaft 46 moves restore actuator 581 (Fig. 5) and its associated transfer gear 75 rearwardly to its normal or inactive position.

Referring now to Figs. 4 and 6, there is shown a short transverse shaft 562 supported in suitable brackets extending rearwardly from frame 42 on the left-hand side of the machine, which shaft pivotally supports the forwardly extending inner finger latch 554 referred to above and an outer finger latch 561 for free turning movement about shaft 562 as an axis. Inner latch 554 is provided with a notch 543 at its free end and is continuously urged in a counter-clockwise direction (Fig. 4) by the resilient action of coil spring 563, one end of which is hooked through aperture 535. The upwardly extending lug or ear 559 on the inner latch 554 is adapted to coact with the downwardly extending arm 544 affixed to shaft 538 in such a manner that counter-clockwise movement of gate 540 imparts a corresponding clockwise movement to inner latch 554 in opposition to the resilient action of spring 563. Outer latch 561 has a general configuration similar to that of inner latch 554, the outer latch or hold pawl 561 being pivotally supported for free turning movement about shaft 562 and having a notch 545 on the free end thereof corresponding in general configuration to notch 543 on latch 554.

As is shown in Fig. 4, shaft 558 has keyed thereto, in a position adjacent to overdraft control link 217, an upwardly extending arm 557 provided at its free end with a triangular slot 556 which receives for free sliding engagement with the sides thereof a pin 555 carried by the lower portion of control link 217. Shaft 558 also has secured thereto an upwardly and forwardly extending arm 560 whose rearward upper surface coacts with a pin 546 carried by outer latch 561, which pin is urged against arm 560 by the resilient action of a coil spring 569 having one end secured to the pin and its other end affixed to a right angle extension 578 formed on the free end of arm 560. It will be recalled that shaft 558 is operatively connected to bar latch 536 through arm 577 and pin 576 (see also Fig. 8). Thus, whenever an ovedraft occurs which moves shaft extension 220 in a predetermined higher order of the machine forwardly, as viewed in Fig. 4, pin 555 causes arm 557, shaft 558, and arm 560 to turn counter-clockwise, as viewed in Fig. 4, and bar latch 536 is released from its right shift position. Thereupon outer latch 561 is moved counter-clockwise through the urgency of spring 569 into its lowermost position wherein notch 545 thereon forms a latching engagement with a pin 564 carried by the upwardly extending arm 582 of a flag actuator 565.

Flag actuator 565 (Fig. 4) is pivotally supported as at 566 on a bracket 567 carried by crossframe 40, and is provided with an upwardly extending cam follower 584 and a downwardly extending arm 583. The actuator 565 is urged in a clockwise direction by a tension spring 568. The cam follower 584 on actuator 565 engages with a restoring cam 549 (Fig. 4) carried by shaft 450, which cam is operable once each revolution to turn actuator 565 counter-clockwise, in opposition to the action of spring 568, to its normally disabled or fully-cocked position wherein pin 564 thereon engages with either notch 545 on outer latch 561, or with the notch 543 on inner latch 554 in the manner illustrated in Fig. 4.

A rule of operation of the machine disclosed herein is that the dividend should be entered in the accumulator register inboard of the tens transfer detecting or sensing member—in the form shown, the part 219—at the higher order end of the keyboard and transfer mechanism, with no significant dividend figure being in a higher ordinal position than the detecting or sensing member. When the machine is operated in accordance with this rule, there will be no premature stopping of the aligning operation caused by a zero intervening between outboard significant dividend figures standing to the left of the detecting member 219.

*Operation*

In the operation of a calculating machine embodying an automatic division alignor constructed and operated in accordance with the instant invention, a depression of division key 145 actuates the automatic division mechanism in such a manner as to impart a clockwise movement to shaft 213 (Fig. 4), thereby rocking the abutment end 224 of control link 217 into operative position with respect to flag 232 so as to enable operation of the division programming control mechanism, which enabling position of link 217 with respect to flag 232 is continuously maintained by latching of the stud 185 and connecting lever 170 until the completion of the automatic division operation. Key 145 also releases division actuator 162 so that the movement imparted thereto by spring 164 (Fig. 3) rocks shaft 504 and arm 507 (Fig. 7), which arm imparts a clockwise movement to lever 510 (Fig. 8) and moves the jaw clutch 523 to the right shift position illustrated in Fig. 8, in which position spring 570 moves bar latch 536 downwardly so as to form a latching engagement between tooth 550 on the latch and the groove 515 provided on the lower end of lever 510.

During the alignment phase of the automatic operating sequence, arm 560 (Fig. 4) presses against pin 546 on outer latch 561 so as to hold the latter in its fully-raised or inactive position wherein the notch 545 thereon is held out of engagement with the pin 564 provided at the top of flag actuator 565. Whenever the machine is in the full-cycle position illustrated in Fig. 4, spring 563 also urges inner latch 554 counter-clockwise so that the notch 543 thereon engages with pin 564 to disable the flag actuator 565. The machine now proceeds to subtract the divisor from the dividend until a tens-carry results in any intermediate order of the machine, whereupon the transfer gear 75 and associated restore actuator 581 in that intermediate order are moved forwardly, or towards the left as viewed in Fig. 5, with the result that the associated disk 539 on the transfer hub 74 moves its coacting finger 541 forwardly so as to impart a counter-clockwise rocking movement to gate 540 about its supporting shaft 538. This rocking movement of gate 540 causes the downwardly extending arm 544 carried by shaft 538 to press against the coacting ear 559 so as to move the inner latch 554 clockwise, as viewed in Fig. 4, to its fully-raised position wherein the notch 543 thereon is released from latching engagement with pin 564 on flag actuator 565. Such movement of latch 554 enables the actuator to turn the flag 232 clockwise about shaft 177 under the urgency of spring 568 until the upper end of flag 232 comes to rest against the forward surface of disk 234. Hence, upon the rocking of gate 540 about its shaft 538 in response to a tens-carry operation, the flag bail 225 (Fig. 4) will be rocked clockwise against the action of spring 227 so as to move the flag 232 into the path of pin 233 and thereby cause the program control shaft 177 to be moved to its rightmost or operative position. During the alignment phase of the operating sequence, the program control mechanism will function as in the case of a division operation with the exception that the carriage will be shifted one ordinal space to the right for each rotation of the shaft 177 instead of to the left as in automatic division. In this manner the carriage will be moved in a direction to cause the highest digits of the dividend and divisor to be automatically brought into alignment prior to the outset of the division operation.

Although the above-described mechanism is responsive to a tens-transfer in any intermediate order to control right shift of the carriage and the entry of a substantial portion of the quotient into the revolutions counter during the alignment phase of the operating sequence, an independent control mechanism which is responsive to an overdraft in a predetermined higher order of the machine is provided to disable the tens-transfer responsive mechanism, to reverse the direction of carriage shift, and to enable the programming mechanism to control the operation of the machine during automatic division in the manner previously described. Preferably, though not necessarily, this overdraft responsive mechanism is associated with the second positively actuated order beyond the keyboard. For example, in a machine having a ten-order keyboard, the predetermined overdraft-responsive order with which the shaft extension 220 is associated is the twelfth order of the machine. Upon the forward movement of shaft 220 caused by the occurrence of an overdraft in this predetermined higher order, the resulting movement imparted to link 217 (Fig. 4) moves arm 557 counter-clockwise through the pin-and-slot connection provided by pin 555 and triangular slot 556. Shaft 558 and arm 560 form an integral assembly with arm 557, which assembly is rocked counter-clockwise along with arm 557 in such a manner that spring 569 is tensioned to move the outer latch 561 in a counter-clockwise direction from the raised or inactive position illustrated in Fig. 4 to its lowermost position wherein notch 545 on latch 561 engages with pin 564 on arm 582 so as to disable the flag actuator 565 throughout the automatic division phase of the operating sequence. This counter-clockwise movement imparted to shaft 558 by arm 557 also moves pin 576 carried by arm 577 towards the right within slot 575, as viewed in Fig. 7, thereby imparting a corresponding counter-clockwise movement to bar latch 536 (see also Fig. 8) which releases tooth 550 thereon from latching engagement with the lower end of lever 510. The resulting counter-clockwise movement imparted to lever 510 by spring 518 releases the shiftable jaw clutch 523 from engagement with the right shift clutch collar 527 and moves it into engagement with clutch collar 528 in such a manner as to enable the carriage shift mechanism for left shift operation. Although the occurrence of tens-transfers within the intermediate orders of the machine will cause inner latch 554 to be intermittently moved into disabling engagement with pin 564 on actuator 565 during both the alignment and automatic division phases of the operating sequence, this rocking movement of inner latch 554 is operative to intermittently permit actuator 565 to move flag 232 into engagement with pin 233 on disk 234 only during the alignment phase of the operating sequence. During the automatic division phase, actuator 565 is continuously disabled by the outer latch or holding pawl 561, and flag 232 is intermittently rocked into engagement with pin 233 in the manner hereinbefore described by the overdraft responsive movement of control link 217 of the normal division control mechanism, during which movement pin 555 is free to move within the triangular slot 556 provided at the free end of arm 557.

When any given number is to be divided by any other given number on the present machine, the operator first enters the dividend into the accumulator wheels 61, with the dividend figures inboard of the detecting member 219, no significant figure of the dividend being in a higher ordinal position than the member 219. The dividend may be entered by setting this figure on the amount keys 20 and depressing the plus bar 90 so as to give the machine a single cycle of operation, thereby causing the amount to be entered into the accumulator wheels in a positive sense, or alternatively the dividend may be entered into the wheels 61 by means of the twirler knobs normally provided on the upper ends of the numeral wheel shafts 59. The dividend having been entered into the wheels 61, and the revolutions counter-wheels 80 having been zeroized, the operator then sets the divisor on the amount keys 20 and depresses the division key 145 so as to trip the division setting actuator 162 (Fig. 3), which causes shaft 504 to be rocked (clockwise in Fig. 7) so as to impart a corresponding clockwise turning movement to lever 510 (Fig. 8) and condition the right shift clutch for engagement, in which position lever 510 is retained in latching engagement with bar latch 536 at the beginning of such operation, as previously described, and outer latch 561 (Fig. 4) is also retained out of engagement with pin 564 on flag actuator 565. At the same time, the overdraft control link 217 (Fig. 4) will be raised in position behind the bail 225 so as to enable operation of the program control device during the actual dividing operation which follows immediately after the factors have been properly aligned. When the division key 145 is depressed, the electric driving motor will be energized and the main clutch engaged in the well-known manner so as to initiate cycling of the main operating mechanism of the machine. Since the machine is automatically set for subtraction upon a depression of key 145, the subtraction process proceeds until a tens-transfer occurs, during which time the revolutions counter-wheels 80 proceed to enter a portion of the dividend. As soon as a tens-carry occurs, however, inner latch 554 is moved by rocker arm 544 out of latching engagement with actuator 565, thereby enabling the latter to move flag 232 into operative engagement with pin 233 so that the program control device will be effective to cause a predetermined sequence of add, shift, and subtract cycles to automatically take place. During each such sequence the carriage 68 is moved one ordinal space to the right for each complete revolution of the mutilated programming gear 198 (Fig. 3). The machine will continue operating in this manner until the carriage has been shifted sufficiently far to the right to cause the highest digit in the dividend to be positioned in alignment with the highest digit in the divisor, whereupon an overdraft will occur in a predetermined higher order of the machine so as to move the transfer pin 221 forwardly and impart a counter-clockwise movement to arm 557, shaft 558, and arm 560 (as viewed in Fig. 4), thereby moving outer latch 561 into latching or disabling engagement with actuator 565, and simultaneously releasing bar latch 536 so as to allow lever 510 to be moved to the left carriage shift position under the urgency of spring 518 (see also Fig. 8). During the automatic division operation which then ensues, and which is fully described in Friden Patent No. 2,229,890, the divisor will be subtracted from the dividend a sufficient number of times to cause an overdraft to occur in the higher order accumulator wheels, whereupon link 217 (Fig. 4) will be moved forward by yoke 219 so as to rock the flag 225 into operative position to cause cycling of the programming control mechanism. This will result in adding back the divisor so as to correct the overdraft, then a left shifting movement of the carriage will occur, and finally the gate 67 will be set for subtraction. Since a substantial portion of the quotient has been entered into the revolutions counter during the alignment phase of the operating sequence, the subtraction will frequently occur only once before an overdraft occurs in the accumulator dials during the division phase so as to cause flag 225 to again be set in operative position and again cause cycling of the program control mechanism to be initiated. This operation will be continued until the carriage has reached its extreme left-hand position, whereupon the division operation will be automatically terminated and stop cycling of the machine. The machine is now ready for another division operation in which the dividend is entered into the accumulator wheels and the divisor is set up on the keys, after which the division key is depressed so as to again set the division aligner mechanism into operation in the manner previously described so as to cause right-hand shifting of the carriage until the factors are aligned, after which the conventional automatic division mechanism will take over control of the machine and cause division of the dividend to be completed in a fully automatic manner.

The following sample calculation further illustrates the operating sequence followed during alignment prior to the outset of an automatic division operation, and also illustrates the manner in which a substantial portion of the quotient is entered into the revolutions counter dials 61 during the alignment phase of the operating sequence. Consider the simple division problem wherein a dividend of "20042" is to be divided by a divisor of "2" on the keyboard, with the carriage shifted out of alignment so that the "2" in the divisor is initially below the "4" in the second order of the dividend. This example is illustrative of the mode of operation only, and numerous other computations of varying complexity involving other initial positions of the carriage may, of course, be rapidly and easily solved by a machine constructed and operated in accordance with the instant invention without departing from the spirit or the scope thereof. Following a depression of the division control key, two subtractive cycles are completed and recorded in the revolutions counter dials of the machine so that the latter reads "2" when the dividend has been reduced to "20002." On the third subtractive cycle a tens-transfer occurs, however, at which time the revolutions counter dial is changed to "3" while the dividend reads "19982." The resulting tens-transfer enables the programming control mechanism to cause an addition cycle which returns the dividend to "20002," turns the counter back to "2," and also initiates a right shift operation which places the "0" in the third order of the dividend immediately over the divisor. During the following subtractive cycle, the dividend is reduced to "19802" and the revolutions counter temporarily reads "12." The tens-transfer which then occurs enables the programming control mechanism to effect a corrective addition cycle, thus restoring the dividend to "20002" and changing the revolutions counter dials to "02," at which time the second shift operation aligns the divisor with the "0" in the fourth order of the dividend. During the following subtractive cycle, the dividend is reduced to "18002," and the revolutions counter reads "102." The resulting tens-transfer causes an additive cycle which restores the dividend back to "20002," changes the revolutions counter to "002," and immediately thereafter moves the carriage one more place to the right so that the divisor is in alignment with the "2" in the fifth or highest order of the dividend. The first subtractive cycle which then follows reduces the dividend to "00002" while changing the revolutions counter to "1002." The second following subtractive cycle produces an overdraft, however, which actuates detent pin 221 in a predetermined higher order of the machine, thus disabling actuator 565, releasing bar latch 536 so as to enable the carriage shift mechanism for left shift operation, and enabling pin 233 to immediately thereafter move the mutilated programming gear 198 to its active position by actuating control link 217 in such a manner as to bring flag 232 into operative engagement with pin 233. Since a substantial portion of the quotient has previously been entered into the accumulator during the alignment phase of the operating sequence, the number of subtractive cycles required during automatic division is substantially reduced, thus substantially decreasing the length of time which would otherwise be required to complete the automatic division phase of the operating sequence.

I claim:

1. In a calculating machine of the class described having a plural order value entering means, a register shiftable relative thereto, and a revolutions counter carried by the said register, a normal division mechanism including a detecting member at the higher order end of said amount entering means and being responsive to an overdraft in a predetermined higher order of said register for controlling operation of the machine in cycles including respectively an addition operation, a register shift to the left and initiation of a subtraction operation in the next lower order of the register, means for entering the dividend in said register inboard of said detecting member with no significant dividend figure in an order to the left of said detecting member, and means for setting the divisor in said value entering means, in combination with an auxiliary mechanism responsive to tens-transfers within the inboard orders of the machine for modifying the control exercised by the said normal division mechanism in such a manner as to cause register shifting to the right and entering of a substantial portion of the quotient into the revolutions counter while automatically bringing the said register into a predetermined alignment with the said value entering means, power operated means for actuating the said auxiliary mechanism, and means responsive to operation of said detecting member during register shifting to the right for disabling said power operated means and stopping carriage shifting to the right when said predetermined alignment has been effected, and for maintaining said power operated means disabled during the ensuing automatic division operation.

2. A calculating machine adapted to perform division operations comprising a frame, a value entering means mounted on said frame for receiving the various digits of a divisor, a register carriage including a revolutions counter mounted for endwise shifting movement on the said frame, a plurality of ordinally arranged register wheels rotatably mounted on the said carriage, the said wheels being settable to represent the various digits of the dividend, a tens-carry mechanism for transferring a unit from a lower order register wheel to a higher order register wheel, a detecting member at the higher order end of said value entering means operable in response to an overdraft in one of said register wheels ordinally aligned therewith, means for entering a dividend in said register inboard of said detecting member with no significant dividend figure in a higher ordinal position than said detecting member, a division aligning mechanism automatically controlled by the tens-carry mechanism in any inboard order of the machine for successively subtracting the divisor from the dividend while entering a substantial portion of the quotient into the said revolutions counter, the said division aligning mechanism being operable to automatically shift the said carriage intermittently in the direction of decreasing orders so as to bring the higher order wheels thereon into predetermined aligned relationship with respect to the said value entering means, and an automatic division mechanism responsive to operation of said detecting member caused by an overdraft in a single predetermined higher order of the machine for reversing the direction of carriage shift.

3. In a calculating machine capable of performing division operations by the successive subtraction method, the combination of a frame, a shiftable carriage mounted on the said frame, a register comprising a plurality of ordinally arranged register wheels in the said carriage adapted to receive a dividend registration, means for shifting the said carriage either in the direction of increasing orders of the register or in the direction of decreasing orders thereof, a plural order value setting device on which the various digits of a divisor may be set, a reversible transmission mechanism for enabling a divisor set up on the said device to be selectively entered additively or subtractively into the said register wheels, a tens-transfer mechanism, a detecting member at the higher order end of said value setting device operable in response to an overdraft in one of said register wheels ordinarly aligned with said detecting member, means for entering the dividend in said register inboard of said detecting member with no significant dividend figure in a higher ordinal position than said detecting device, a programming mechanism normally responsive to an overdraft in a predetermined higher order of said register for controlling and timing the operation of the reversible transmission mechanism and of the carriage shifting means to effect shifting of the carriage in the direction of increasing orders during automatic division, an auxiliary control mechanism responsive to a tens-transfer in any inboard order of the machine for controlling operation of the said programming mechanism to cause a reverse operation of said carriage shifting means, power actuated means for enabling operation of the said auxiliary control mechanism, and means actuated by the said detecting member for disabling the said power means.

4. In a calculating machine having an automatic division mechanism which includes a keyboard on which the digits of a divisor may be set, a carriage laterally shiftable with respect to the said keyboard, a register in the said carriage on which the digits of a dividend may be set, a tens-transfer mechanism, a detecting member at the higher order end of said keyboard operable in response to an overdraft in an order of said register ordinarily aligned with said detecting member, and means for entering the dividend in said register inboard of said detecting member with no significant dividend figure in a higher ordinal position than said detecting member, in combination with a shiftable clutch operable to reverse the direction of shift of the said carriage, mechanism responsive to operation of said detecting member caused by an overdraft in a predetermined higher order of the machine to position the said clutch for left shift operation, mechanism responsive to a tens-transfer in any of the inboard orders of the machine operable to position the said clutch for right shift operation, a programming device successively controlled by the said tens-transfer responsive mechanism and said overdraft responsive detecting member for controlling uninterrupted cycling of the machine, a normally inactive actuating means for enabling said programming device to effect shifting of said carriage to the right, mechanism responsive to a tens-transfer in any inboard order of the machine for alternatively rendering the said actuating means active and restoring the same to its inactive position, and means controlled by said detecting member for retaining said actuating means in normal position and conditioning the machine for shifting of the carriage to the left.

5. In a calculating machine having an automatic division mechanism which includes a keyboard on which the digits of the divisor may be set, a shiftable carriage including a register on which the digits of a dividend may be entered, a carriage shift control mechanism normally operable to cause left shift of the said carriage, means operated by the depression of a division control key for positioning the said shift control mechanism so as to cause right shift operation of the said carriage, a tens-transfer mechanism, a detecting member at the left of said keyboard and being responsive to an overdraft in an order of said register ordinally aligned with said detecting member, and means for entering the dividend in said register inboard of said detecting member with no significant dividend figure in a higher ordinal position than said detecting member, and mechanism responsive to operation of said detecting member caused by an overdraft in a predetermined higher order of the machine for releasing the said shift control mechanism from the said right shift position, the combination which comprises a cyclically operable programming device normally controlled by the said overdraft responsive detecting member for operating the said division mechanism and the said shift control means, a normally inactive power driven actuator for independently conditioning operation of the said programming device so as to condition said shift control mechanism for right shift operation, means controlled by the said overdraft responsive detecting member for disabling the said actuator during automatic division, means controlled by a tens-transfer in any inboard order of the machine for releasing the said actuator from its normally inactive position whenever the said actuator is not disabled by the said overdraft responsive detecting member, and cam actuated means for restoring the said actuator to its inactive position following each such release thereof.

6. In a calculating machine of the class described having a value entering means for receiving a divisor factor, a register for receiving a dividend factor, means for transmitting the said dividend factor from the said value entering means into the said register, means for shifting the said register relative to the said value entering means, a tens-transfer mechanism, a detecting member at the higher order end of said value entering means and being responsive to an overdraft in an order of said register ordinally aligned with said detecting member, and means for entering the dividend factor in said register inboard of said detecting member with no significant dividend factor figure in a higher ordinal position than said detecting member, the combination with a mechanism for automatically dividing the dividend by the divisor which comprises a positionable member movable from a normal idle position to an active position, and means responsive to operation of said detecting member caused by an overdraft in a predetermined higher order of the machine for intermittently moving said positionable member from the idle to the active position during automatic division, aligning mechanism for effecting shifting of said register to align the dividend factor therein with the divisor factor in said value entering means, said aligning mechanism including actuating means independently controlled by a tens-transfer in any inboard order of the machine for moving the said positionable member from its idle to its active position, means responsive to tens-transfers within the inboard orders of the machine for intermittently releasing the said actuating means during automatic alignment of the said dividend with the divisor prior to the outset of the division operation, and means controlled by said detecting member for disabling said actuating means at the end of an aligning operation and maintaining said actuating means disabled during the ensuing division operation.

7. In a calculating machine of the class described having a plural order value indexing means, an actuating means, a register shiftable relative thereto, and means for shifting said register, the combination which comprises a normal division mechanism for controlling operation of the machine and the shifting of the said register during automatic division; said mechanism including means for controlling operation of said actuating means for a plural cycle subtraction, a detecting member at the higher order end of said value indexing means responsive to an overdraft in a predetermined higher order of said register, a shift control member resiliently biased to a position to cause a left shift operation of said shifting means, and means controlled by said detecting member for initiating operation of said shifting means; a division control member operative to initiate operation of said division mechanism; means operated by said division control member for positioning said shift control member in a position to cause right shift operation of said shifting means; means for latching said shift control member in said right shift position; and an auxiliary control device responsive to tens-transfers within the inboard orders of the machine for initiating operation of said shifting means; and means controlled by the said detecting member for disabling the said auxiliary control device means and for releasing said latch.

8. In a calculating machine capable of automatically carrying out problems in division and having a value indexing means, a dividend receiving register shiftable relative thereto, means for shifting said register in either direction including a shift initiating member normally biased to cause a left shift of said carriage when said member is operated, a differential actuator for entering a value set in the value indexing means into said register additively or subtractively, an automatic division control mechanism including means for initiating a plural cycle subtraction operation and a detecting member at the higher order end of said value entering means operable in response to an overdraft in a predetermined higher order of said register to initiate a series of operations including operation of said shift initiating member, and means for initiating operation of said division control mechanism, the combination which comprises means operated by said initiating means for positioning said shift initiating member to cause a right shift of said carriage when said member is operated, latching means for latching said shift initiating member in said right shift position, an auxiliary control mechanism responsive to a tens-transfer in any inboard order of the machine, power operated means controlled by the said auxiliary control mechanism for operating said shift initiating member, and means controlled by operation of said detecting member for disabling the said auxiliary control mechanism and releasing said latch.

GEORGE W. HOPKINS.

References Cited in the file of this patent

UNITED STATES PATENTS

| Number | Name | Date |
|---|---|---|
| 2,327,981 | Friden | Aug. 31, 1943 |
| 2,365,507 | Allen | Dec. 19, 1944 |
| 2,408,097 | Pott | Sept. 24, 1946 |
| 2,416,809 | Avery | Mar. 4, 1947 |